Aug. 20, 1957  L. B. BIEBEL  2,803,448
COMPUTING SCALE
Filed July 23, 1952  3 Sheets-Sheet 1
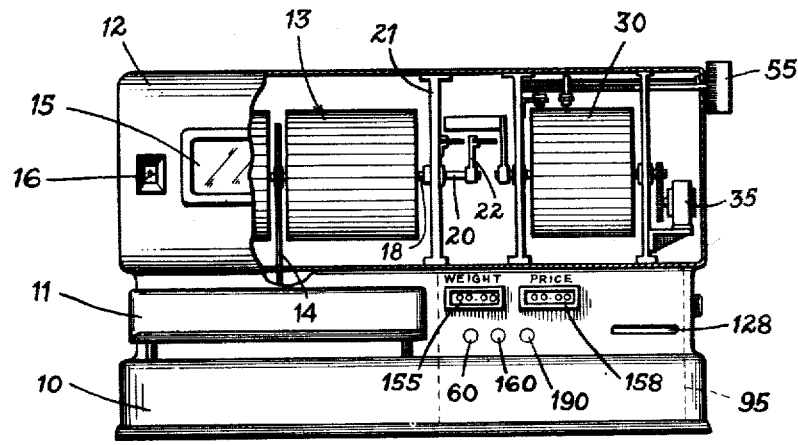
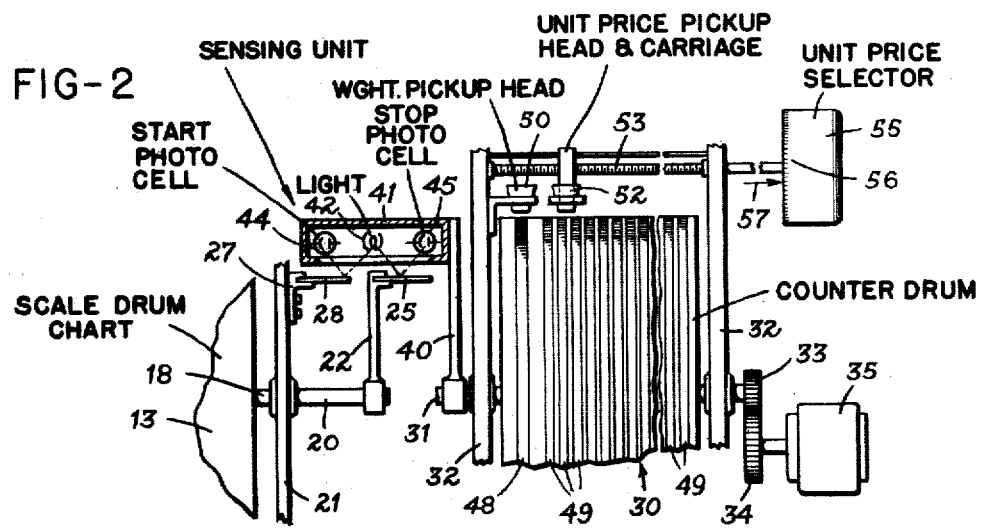
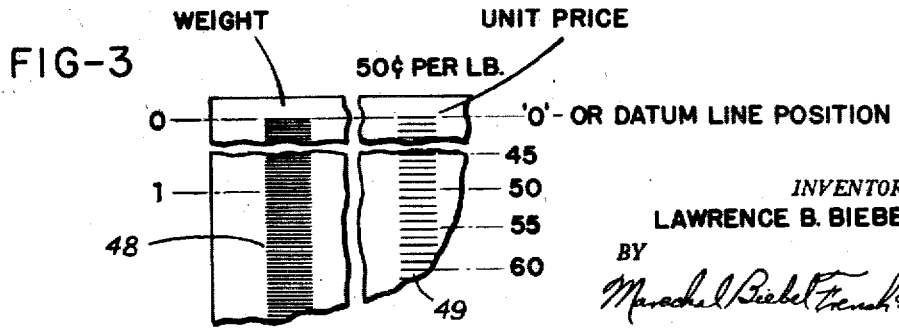
INVENTOR.
LAWRENCE B. BIEBEL
BY
ATTORNEYS

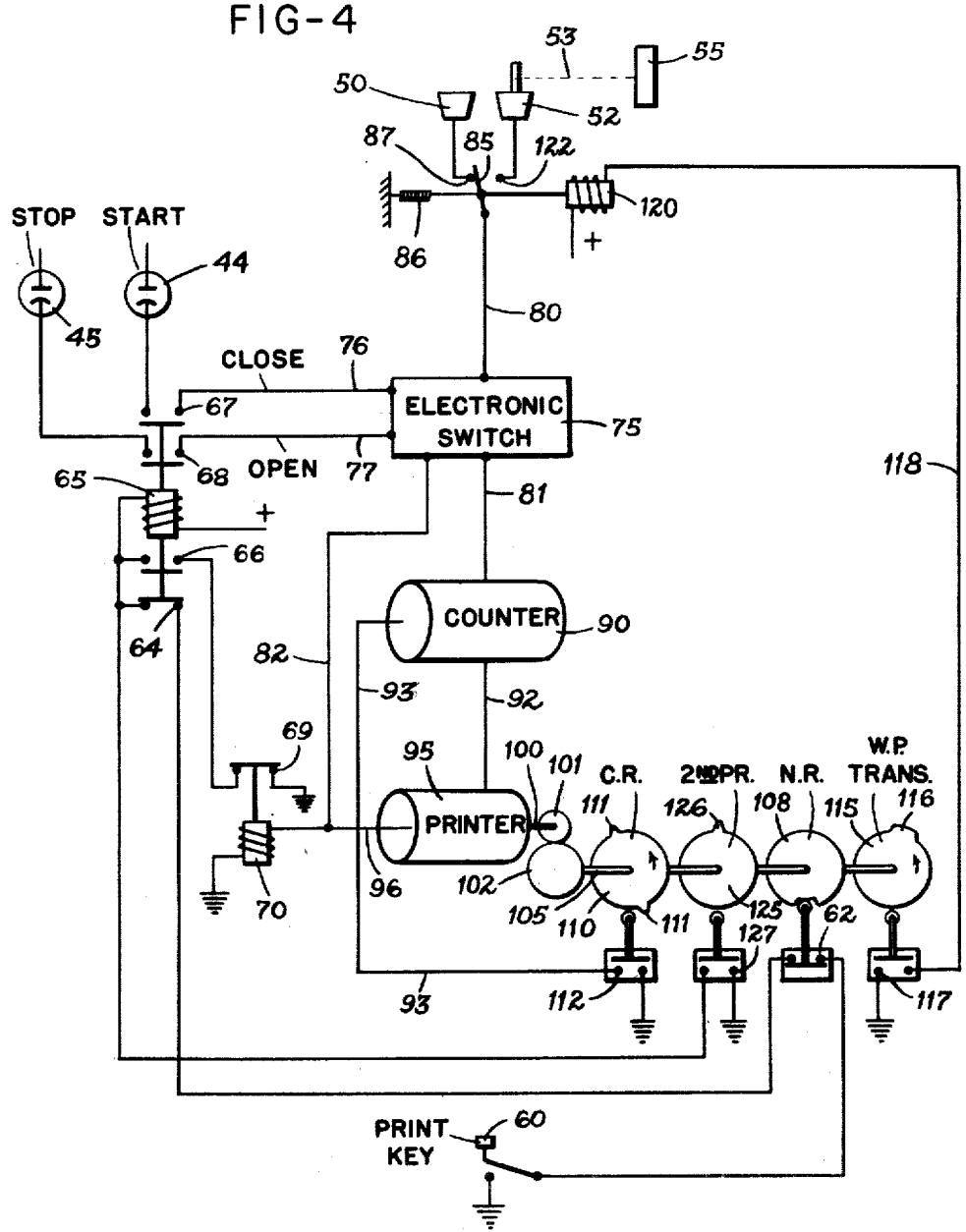

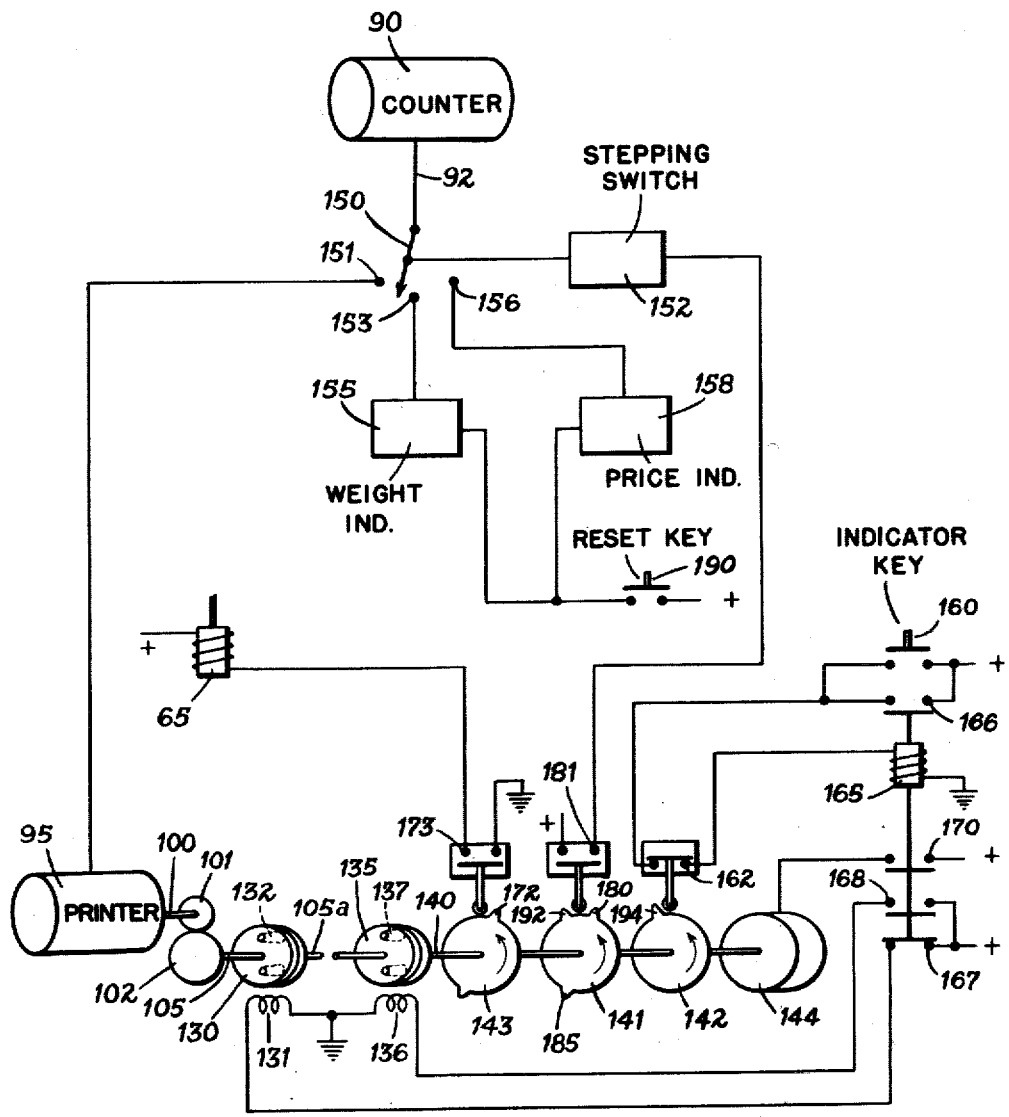

United States Patent Office 2,803,448
Patented Aug. 20, 1957

2,803,448

COMPUTING SCALE

Lawrence B. Biebel, Dayton, Ohio, assignor to The Hobart Manufacturing Company, Troy, Ohio, a corporation of Ohio Application July 23, 1952, Serial No. 300,403

10 Claims. (Cl. 265—29)

This invention relates to scale mechanism and more particularly to a computing scale which produces either a visual or a printed record of the operation.

It is the principal object of the invention to provide a simple and accurate scale mechanism which will weigh rapidly and accurately and which will also provide an indication, either in the form of a visual sign or a printed ticket on which are shown the weight and value of the article.

It is a further object to provide such a scale in which the weighing and furnishing of the information takes place rapidly and accurately, and which is protected against possible inaccurate steps on the part of the operator.

It is also an object to provide a mechanism which counts the weight and value of the article arithmetically, providing a simple and accurate indication of the count, and accomplishing the count with such speed that there is no appreciable delay involved in the operation.

It is a still further object to provide a scale which may incorporate a conventional drum chart for computing and weighing purposes affording a visual indication or in which that chart may be dispensed with and weight and value indications produced on an indicating sign to afford a large scale reading.

It is likewise an object to provide such a scale in which the range of unit prices can be as extensive as desired and in which by simple means the range can be changed as desired.

Other objects and advantages will be apparent from the following description, the accompanying drawings, and the appended claims.

In the drawings—

Fig. 1 is a front elevational view of a scale mechanism constructed in accordance with the present invention with a portion of the front casing being broken away;

Fig. 2 is a view in elevation showing the essential features of the mechanism including the sensing unit, the counter drum and the unit price selector;

Fig. 3 is a broken view on an enlarged scale showing a portion of the markings on the counter drum;

Fig. 4 is a schematic view showing the circuit connections comprising the counting and printing circuits; and Fig. 5 is a schematic view showing circuit connections of additional mechanism utilized for producing a separate visual indication of weight and price.

Referring to the drawings which illustrate a preferred embodiment of the invention the scale is shown generally as having a base 10 containing the weighing mechanism and with the usual platter 11 for receiving the article to be weighed. The upper part of the casing 12 contains a drum chart 13 which is actuated by a rack bar 14 from the weighing mechanism, in the conventional manner. A viewing aperture 15 provides for reading the selected column from the usual chart, and a smaller window 16 provides for a direct reading of the weight scale on the chart. Any suitable weighing and chart indicating mechanism may be used as desired.

The housing 12 is extended to one side for the purposes of this invention and the chart shaft 18 has an overhanging part 20 which projects beyond the support 21. An arm 22 is fixed to the shaft 20 and carries a small mirror 25 so that the mirror thus moves in an arc about the center of shaft 20, through an angle which is the same as the angle of rotation of the chart, under the particular weight applied. Support 21 also carries a bracket 27 to which is attached a mirror 28 which is similar except that instead of being movable it is fixed, the two mirrors being located in the same radial position as shown in Fig. 2 but offset laterally from each other.

A counter drum indicated generally at 30 is rotatably supported on shaft 31 in brackets 32 within the housing 12. A drive pinion 33 is secured to the shaft and is driven by gear 34 from motor 35. The counter drum thus rotates continuously during the time the scale is in operation and at a suitable speed such as to provide the desired rapid counting action. It should be particularly noted that there is no need for a synchronous drive, and hence motor 35 can be of any suitable type such as an induction motor, the system being self-synchronous and minor variations in speed of rotation having no effect on the accuracy of the device. As an example, a suitable speed for the rotation of counter drum 30 is 300 R. P. M.

The overhanging end of shaft 31 of the counter drum carries an outwardly extending arm 40 to which is attached a sensing unit 41 which is thus rotatably supported radially outwardly of the movable mirror 25 and fixed mirror 28. The sensing unit incorporates a light source 42 and a pair of photocells 44 and 45. Suitable reflectors are arranged to direct beams of light from the source 42 toward both the mirrors 25 and 28, and such mirrors are so arranged that when they intercept the light beams, they will cause reflection thereof, respectively, toward the two photocells. The photocell 44 which cooperates with the stationary mirror 28 is identified as the "Start" photocell while photocell 45 which cooperates with movable mirror 25 is identified as the "Stop" photocell. While optical means have been disclosed for sensing the extent of displacement of the weighing mechanism, this is for illustrative purposes and magnetic means could be utilized for this purpose if desired.

The main body of the surface of counter drum 30 is formed with a large number of series of recorded markings or pulses arranged in different columns and extending entirely around the circumference except for a short blank or gap immediately ahead of the zero weight position. These pulses may be recorded and picked up either optically or magnetically, the material of the drum being suitably selected for the particular type of pulses desired. For example, where an optical system is used the pulses will be formed as lines of contrasting light characteristics with the remainder of the drum and the pickup will comprise a photoelectric cell which will respond as each recorded pulse passes beneath it. If a magnetic system is employed, the drum will be of suitable material to receive magnetic recordings thereon and the pickup heads will be such as to have a voltage induced therein as each pulse passes below the respective pickup head. For purposes of illustration, the magnetic system is described herein.

There are two patterns of recorded pulses on the drum 30. Referring to Figs. 2 and 3 the left-hand column 48 has a column of pulses uniformly positioned around the circumference of the drum which are spaced in terms of a convenient small unit of weight, such as hundredths of a pound. That is, within the angular displacement between the fixed and movable mirrors produced by a weight of one pound, there will be one hundred recorded pulses in column 48. It will be understood of course that other divisions may be selected if desired but this particular arrangement will be found to be convenient.

Adjacent column 48 are a series of other columns 49 containing recorded pulses corresponding to different computed values, there being preferably one such pulse for each penny of value. It will be understood of course that the pulses in successive columns vary in spacing in accordance with the variations in unit price. Fig. 3 shows for example one of the columns 49 corresponding to a unit price of $0.50 per pound. It will be seen that the pulses are spaced twice as far apart from each other as those in weight column 48 which are intended to measure and represent hundredths of a pound. Suitable spacing of the pulses in column 48 will provide for recording any desired price per pound, and additional such columns can be provided in the axial direction as far as desired to make available a wide range of unit prices. The width of any one column can be relatively narrow, so that within the ordinary limits of a drum chart, a much larger number of recorded price columns can be provided than in the case where not only lines but figures as well are required to be shown.

A weight pickup head 50 is mounted in a stationary position on frame 32 and is properly oriented with respect to the zero weight position of movable mirror 25 so that both of them occupy a zero or datum line position corresponding to zero weight and zero value. The fixed mirror 28 is preferably located slightly in advance of the datum line position, and there is a space or gap in the recorded pulses on the drum between the maximum and zero positions on each column as described above. A second or unit price pickup head 52 is also mounted in the same plane or datum line position but is mounted on a screw shaft 53 by means of which it may be caused to traverse the columns 49 of the counter drum 30 and to be set immediately above and in operative relation with a particular one thereof. The pickup head 52 is conveniently set by means of a unit price selector 55 having unit price designations 56 thereon cooperating with an index 57 so that the operator can readily pick out the desired unit price by setting the desired price opposite the index.

Referring now to the circuit diagram of Fig. 4, and assuming a weight to have been applied to the platter and the scale to have come to rest, the operator then depresses an actuating or "Print" key 60. On closing this key establishes a circuit through non-repeat switch contacts 62, interlocking contacts 64 of relay 65, and the energizing coil of that relay to a source of power of suitable characteristics for control purposes indicated by the designation +. This energizes relay 65 and raises the armature thereof, causing the opening of contacts 64 and the closing of contacts 66, 67, and 68. The opening of contacts 64 disables key 60, while the closing of contacts 66 establishes a holding circuit through normally closed contacts 69 of relay 70 so that as long as relay 70 remains unenergized, the circuit for relay 65 is maintained.

The closing of contacts 67 and 68 complete circuits respectively from the Start photocell 44 and Stop photocell 45 into an electronic switch indicated at 75. The switch is of any suitable or known construction and is of such character that it has a connection 76 through which it may receive a pulse to cause the switch to close, and another circuit 77 through which it may receive a pulse to cause the switch to open. The switch has an input circuit 80 and an output circuit 81 for transmitting pulses when in closed position. It also has a connection 82 which is arranged to transmit a single pulse whenever the switch opens. Switches of this character operate with extreme speed and will close at the same instant that it receives a pulse in its closing circuit.

The counter drum and sensing unit are in continuous rotation, and the next time that sensing unit 41 passes the Start photocell 44 following the closing of switch contacts 67 and 68, a light beam is flashed from source 42 to Start photocell 44 which causes the closing of electronic switch 75. The input circuit 80 of the switch 75 is connected to a single pole double throw switch 85 which is biased by spring 86 to the contact 87 which is connected to weight pickup head 50. Since the operation of switch 75 is instantaneous, the pulses received by the weight pickup head beginning with the datum line position are transmitted into the switch and through its output circuit 81 into a counter indicated generally at 90. Such counter is preferably of the electronic type and may be arranged to operate on a binary or decimal system as desired. Such counters are well understood, and the details of those circuits need not be described. The counter has an output circuit 92 which feeds into a printer indicated at 95, by means of which the count established in the counter is transmitted to the printer to cause actuation thereof. If the counter is basically binary in function, that count is preferably converted so that the printer will operate in the ordinary decimal system. The counter has a reset circuit 93 and in response to a pulse in that circuit will be reset to a zero position. Likewise the printer has a trip circuit 96 and in response to transmission of a pulse in this circuit, the printer will go through a predetermined cycle to cause the printing of a ticket having a count thereon corresponding to the count in counter 90.

As the counter drum continues to rotate, the weight pickup head 50 receives a pulse for each of the recorded pulses 48, and these pulses are thus transmitted to and accumulated or counted in the counter. This operation continues until the sensing unit 41 has revolved around to the position occupied by movable mirror 25, at which time a light beam is flashed to Stop photocell 45. This causes a pulse to be transmitted through line 77 into switch 75 which thereupon opens its circuit and discontinues the transmission of any further pulses from the weight pickup head. Upon opening, the switch 75 transmits a pulse through line 82 which momentarily energizes relay 70, causing the opening of its contacts 69, thereby breaking the holding circuit for relay 65, which opens to break the circuit between both Start and Stop photocells and the electronic switch. Hence no further impulses will be transmitted to affect the electronic switch which remains in open circuit position during the printing cycle.

The same pulse through circuit 82 is transmitted through line 96 to trip the printer. The printer then goes through a complete printing cycle, causing the printing in a predetermined portion of the ticket of the count determined and fed to it by the counter. The printer embodies its own cycling mechanism and after being tripped, will complete one full cycle resulting in one revolution of its shaft 100. Shaft 100 has a pinion 101 driving a larger gear 102 which is fixed to cam shaft 105, the shaft 105 being arranged to complete a half revolution in a counterclockwise direction during a full cycle of operation of the printer. As soon as the cam shaft 105 begins to turn, one of its cams 108 causes the opening of non-repeat switch 62 thereby disabling the actuating key 60 so that that key will be ineffective even if it should be accidentally closed during the printing operation. Such disabling continues throughout two full cycles of the printer, that is, until the printer has finished the printing of both weight and price, and only at the end of the complete cycle is the control returned to the Print key.

Another cam 110 has two projections 111 thereon substantially opposite each other and arranged so that the first engages and causes the closing of switch 112 shortly after the printer finishes its operation. Closing of switch 112 energizes the reset circuit 93 of the counter and thus causes the counter to return to zero position. The second projection performs a like function during the second print cycle.

The third cam on shaft 105 is the transfer cam 115 for shifting the count from the recorded weight pulses to the recorded price pulses. This cam has an extended projection 116 which engages and causes the closing of switch 117 after the printer has completed its first cycle. Closing of this circuit causes the energizing of a circuit 118 connected to solenoid 120, causing that solenoid to attract its armature and to transfer switch arm 85 to its alternate position where a circuit is completed through contact 122. It will be seen that when this occurs the weight pickup head is disconnected and price pickup head 52 is connected to the input circuit 80 of the electronic switch where it remains until the printer begins its second print cycle.

A fourth cam 125 on shaft 105 has a single lobe 126 to cause the closing of switch 127. This switch is connected to the operating coil of relay 65 and is actuated in the final portion of the first cycle of operation of the printer. Thus as the printer finishes its first operation and prints the weight, the switch 127 accomplishes a function exactly the same as that of actuating key 60, to initiate a second cycle of operation of the device at the proper time in the sequence.

Without detailed analysis it will be understood that the system then functions as before, i. e., it starts the count at the datum line position and the number of counts received in counter 90 is determined by the particular setting of the pickup head 52 and the number of pulses on the selected column between the datum line position and the angular position occupied by movable mirror 25. Since that angle is the same as previously, the count in the counter will now represent pennies of value or price for the article at the selected unit price.

The system continues to function as above described, the circuit of electronic switch 75 being opened at the end of the angle determined by movable mirror 25, the count being transferred to the printer and the printer being tripped to begin its second cycle in response to the opening of the electronic switch. The printer then completes its second cycle, printing the value in a proper position on the ticket which has been indexed to such position by the printer mechanism. The completed ticket may be delivered through slot 128 at which time the printer and cam shaft 105 will have returned to its original position, the counter and printer being cleared, and ready for a subsequent operation. It will be understood that the weight graduations and price graduations at a selected unit price are counted separately and either may be counted first as desired; likewise separate counters may be employed if desired for the two counting operations.

In some cases it may be desirable to provide an additional visual indication of either weight, or price, or both. The invention provides for this either in conjunction with the usual computing chart 13, or if desired such chart may be eliminated, thus further reducing the size and expense of the device, retaining only the shaft 18—20 and the movable mirror actuated to a predetermined angle as determined by the weight.

Such a circuit is shown diagrammatically in Fig. 5, it being understood that Fig. 5 shows only those parts which differ from or are in addition to the circuit represented in Fig. 4. The counter is shown at 90, the printer at 95 and the printer cam shaft at 105. The cams however are mounted on a separate section 105a of the shaft and between the gear 102 and the cams there is now provided a coupling such as a magnetic clutch 130 having an energizing coil 131. The clutch may also embody centering pins 132 to assure accurate register of the two sections of the shaft. Section 105a thus carries the cams 108, 110, 115 and 125 which are constructed and operate in the same manner set forth above and hence are omitted from the diagram for purposes of simplification.

A second electromagnetic clutch 135 has a similar energizing coil 136 and centering pins 137. It provides for coupling shaft section 105a with an extended shaft 140 on which cams 141, 142 and 143 are mounted and which is arranged to be driven by a separate drive motor 144. It will thus be seen that with clutch 130 engaged and clutch 135 disengaged, the system will operate in the same manner described above. However with clutch 135 engaged and 130 disengaged, the two shaft sections 105a and 140 may be actuated by motor 144 without disturbing the printer.

Instead of being connected directly to the printer, the output circuit 92 of the counter is connected to the movable arm 150 of a stepping switch having a series of positions. In the first position with the arm in contact with terminal 151, the counter feeds into the printer and the circuit operates in the manner described in detail above. In response however to the actuation of the stepping switch, the switch arm 150 will progress to a second terminal 153 where the counter is then connected to feed into a visual weight indicator 155. This may be of suitable construction to receive the count in the counter and to provide a lighted and preferably relatively large designation of numerals indicative of the weight, in terms of pounds and hundredths of pounds, as controlled by the output of the counter. The third terminal 156 is connected to an indicator 158 which is similar to 155 but is arranged to provide an indication of the price.

Assuming now that it is desired to operate the device to provide the visual indication at indicators 155 and 158, with a weight on the platter and the scale at rest, indicator key 160 is depressed momentarily. Thereupon a circuit is closed from a source of power through normally closed contacts 162 controlled by cam 142 to energize the solenoid of relay 165. Upon being energized, this relay closes its contacts 166, thereby completing a self-holding circuit around key 160 and opening its contacts 167 and closing its contacts 168 and 170. Prior to such energization, the relay occupied its lowermost position in which an energizing circuit was completed from a source of power through contacts 167 to the operating coil 131 of magnetic clutch 130. As a result the system operated normally for printing, precisely in the manner described in detail above. However upon energization, this circuit to coil 131 is broken, thus deenergizing clutch 130, and energizing coil 136 through switch 168 to couple the cam shaft 105a with drive motor 144.

Simultaneously, relay 165 closes its contacts 170 supplying power to motor 144 and causing it to rotate the cam shaft 105a in the same manner as described above, but without affecting printer 95. As soon as motor 144 begins to turn, projection 180 on cam shaft 141 causes the closing of switch 181 to activate stepping switch 152, thereby transferring contact arm 150 from terminal 151 to terminal 153.

Cam 143 carries a projection 172 which at the same time closes switch 173 to complete a circuit for energizing relay coil 65. This trips the system in the same manner as the actuation of key 60, and the system then functions as above described to count from the recorded weight pulses 48, into the counter 90 which count is then transmitted into the weight indicator 155.

The system continues through the second cycle under the control of the cams above described on shaft section 105a, and in the meantime the further turning of shaft 140 causes a second projection 185 on cam 141 to close switch contacts 181 the second time, thereby actuating the stepping switch to move arm 150 over to terminal 156. Hence the count received during the second cycle in counter 92, which is picked up from the price pickup head 52, will be properly fed into the price indicator 158. It will be understood that these indicators will retain the designations based on the output received from counter 90 indefinitely, and that the intermediate resetting of the counter will not affect such indication. The indicators may be reset when desired by pushing the manual reset key 190.

In the final portion of the rotation of shaft 140, a projection 192 on cam 141 again closes switch 181, this final actuation causing the stepping switch to return to its original position with arm 150 in contact with terminal 151, thereby restoring the system for the printing operation. At the same time, projection 194 on cam 142 opens switch contacts 162, breaking the holding circuit for relay 165, thereby stopping motor 144, with consequent uncoupling of clutch 135 and reengagement of clutch 130. The system is thereby restored to its original condition for a subsequent cycle of operation for either printing or indicating as desired.

The invention thus provides a flexible, accurate and rapid system for weighing and providing an indication of weight and price of an article, either visual or printed, or both. It is directly applicable to present scale constructions, it makes possible the elimination of the present type chart and provides both a visual and a printed record of the transaction. While the system has been described as normally causing the printing of a ticket, this is for illustration, and by suitable rearrangement the visual indicators may form the normal indication and the circuit be arranged to print the ticket in response to selective actuation.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A computing scale having a weighing mechanism and a load receiving platter, a member connected with said weighing mechanism and movable through an arc proportional to the weight of an article on said platter, a continuously rotatable counter drum having thereon a plurality of graduations arranged in columns each having a datum line position, each of said graduations corresponding to a cent of value and being arranged with the same spacing between successive graduations in each column and with the spacing differing in different columns corresponding to different unit prices, means for continuously rotating said drum, a high speed counter, pickup means adjacent but out of contact with said drum for picking up a count of the number of graduations passing thereby on a single one of said columns, selector means for adjusting said pickup head in predetermined cooperating relation with a selected one of said columns corresponding to the selected unit price of the article, sensing means rotatable with said drum and cooperating with said member for activating said pickup means at said datum line position and deactivating the same when said drum has traveled through said arc proportional to weight, and means controlled by said sensing means for transmitting to said counter a count of the number of graduations passing said pickup means within said arc and representative of the total value of the article.

2. A scale having a weighing mechanism and a load receiving platter, a shaft connected with said weighing mechanism and displaceable from a reference position through an arc proportional to the weight of the load on said platter, a counter drum having a series of recorded graduations around the circumference thereof uniformly spaced in accordance with units of weight, means for continuously rotating said drum, a sensing unit continuously rotatable with said drum, a counter, fixed pickup means controlled by said sensing unit located adjacent but out of contact with said drum and responsive to the passage of said graduations for actuating said counter to count the graduations on said drum, means for rendering said sensing unit operative to cause the counting of said graduations through said pickup means during the portion of a revolution of said drum corresponding to said arc to produce a count proportional to weight, means for selectively preventing the operation of said sensing unit during continuous rotation of said drum to provide for the placing of a load on the platter and for the scale to reach a balance and means for rendering said sensing unit operative on the next passage thereof past said reference position after said scale has reached a balance.

3. A scale having a weighing mechanism and a load receiving platter, a shaft connected with said weighing mechanism and rotatable from a fixed reference position through an arc proportional to the weight of the load on said platter, a counter drum having a series of recorded graduations around the circumference thereof spaced in accordance with units of weight, means for continuously rotating said drum, a counter, fixed pickup means adjacent but out of contact with said drum and responsive to the passage of said graduations and producing an output for actuating said counter to count the graduations on said drum, a sensing unit continuously movable with said drum past said reference position and the displaced position of said shaft for controlling the operation of said pickup means, said sensing unit having a start circuit and a stop circuit for controlling the output of said pickup means to said counter, means for selectively rendering said sensing unit operative at any point in the course of its movement after said scale has reached a position of balance, and means responsive to the next passage of said sensing unit past said reference position after said sensing unit has been rendered operative for operating said start circuit to actuate said pickup means to count the number of graduations within said arc and for operating said stop circuit when said sensing unit has moved past said displaced position of said shaft.

4. A scale having a weighing mechanism and a load receiving platter, a shaft connected with said weighing mechanism and displaceable from a fixed reference position through an arc proportional to the weight of the load on said platter, a counter drum having a series of recorded graduations thereon uniformly spaced in accordance with units of weight, means for continuously rotating said drum, a counter, fixed pickup means responsive to the passage of said graduations for actuating said counter to count the graduations on said drum, a sensing unit continuously rotatable with said drum in a path adjacent but out of contact with said reference position and said shaft having a start circuit and a stop circuit for controlling said pickup means, means in and rotatable with said sensing unit for operating said start circuit for starting said pickup means in response to the passage of said sensing unit past said reference position, means in and rotatable with said sensing unit for operating said stop circuit for stopping said pickup means during the same revolution in which it was started in response to the passage of said sensing unit past said shaft in its displaced position, means for rendering said sensing unit inoperative during continuous rotation of said drum and sensing unit to provide for placing a load on the scale and for the scale to reach a balance, and means for rendering said sensing unit operative on the next passage thereof past said reference position after said scale has reached a balance.

5. A scale having a weighing mechanism and a load receiving platter, a shaft connected wtih said weighing mechanism and displaceable from a fixed reference position through an arc proportional to the weight of the load on said platter, a counter drum having a plurality of tracks of recorded graduations thereon with the graduations of different tracks spaced in accordance with units of value at different unit prices, means for continuously rotating said drum, a counter, pickup means responsive to the passage of said graduations for actuating said counter to count the graduations on said drum, means for adjusting said pickup means in cooperative relation with a selected one of said tracks corresponding to a selected unit price per pound, a sensing unit continuously rotatable with said drum in a path adjacent but out of contact with said reference position and said shaft, means in and rotatable with said sensing unit for starting the operation of said pickup means in response to the passage of said sensing unit past said reference position, and means in and rotatable with said sensing unit for stopping the operation of said pickup means during the same revolution in which it was started in response to the passage of said sensing unit past said shaft in its displaced position to produce a count in said counter corresponding to the value of the load at the selected unit price.

6. A computing scale having a weighing mechanism and a load receiving platter, a shaft connected with said weighing mechanism and displaceable through an arc proportional to the weight of the load on said platter, a counter drum having a series of recorded graduations around the circumference thereof spaced in accordance with units of weight and a plurality of other series of graduations spaced in accordance with units of value at different unit prices, means for continuously rotating said drum, a sensing unit rotatable with said drum for sensing said reference position and the displaced position of said shaft, a counter, fixed pickup means adjacent but out of contact with said drum and responsive to the passage of selected ones of said series of graduations for actuating said counter to count the graduations on said drum in a plurality of separate counting operations, means in said sensing unit for activating said pickup means to count into said counter said graduations during the portion of a revolution of said drum corresponding to said arc to produce a count representing the weight of the load, and means for operating said sensing unit to activate said pickup means over the same said arc during a different revolution of said drum for separately counting into said counter the number of graduations on a selected one of said other series of graduations to produce a count representing the value of the load at a selected unit price.

7. A computing scale having a weighing mechanism and a load receiving platter, a shaft connected with said weighing mechanism and displaceable from a reference position through an arc proportional to the weight of the load on said platter, a counter drum having a series of recorded graduations around the circumference thereof spaced in accordance with units of weight and a plurality of other series of graduations spaced in accordance with units of value at different unit prices, means for continuously rotating said drum, a sensing unit rotatable with said drum for sensing said reference position and the displaced position of said shaft, a counter, pickup means adjacent but out of contact with said drum and responsive to the passage of selected ones of said series of graduations for actuating said counter to count the graduations on said drum in a plurality of separate counting operations, means in said sensing unit for activating said pickup means to count into said counter said graduations during the portion of a revolution of said drum corresponding to said arc to produce a count thereof, and sequential operating means for activating said sensing unit during one revolution of said drum to control said pickup means for counting into said counter the graduations within said arc on said weight series of graduations and for separately counting into said counter the graduations over the same said arc during a different revolution of said drum on a selected one of said value series of graduations.

8. A computing scale having a weighing mechanism and a load receiving platter, a shaft connected with said weighing mechanism and displaceable from a fixed reference position through an arc proportional to the weight of the load on said platter, a counter drum having a series of graduations thereon spaced in accordance with units of weight and forming a weight track, said counter drum also having additional series of graduations thereon spaced in accordance with units of value forming value tracks, means for continuously rotating said drum, a sensing unit continuously rotatable with said drum in a path adjacent but out of contact with said reference position and said shaft, a counter, pickup means responsive to the passage of said graduations on said weight track and on a selected one of said value tracks for separately actuating said counter to count the graduations on said drum on different revolutions of said drum, means in and rotatable with said sensing unit for starting said pickup means in response to the passage of said sensing unit past said reference position to count the graduations on one of said tracks, means in and rotatable with said sensing unit for stopping said sensing unit during the same revolution in which it was started in response to the passage of said sensing unit past said shaft in its displaced position, means for deactivating said sensing unit, means for producing a record of the count in said counter corresponding to the number of graduations on one of said tracks over said arc, and means for thereafter reactivating said sensing unit following the operation of said record producing means for operating said pickup means to count and produce a record of the number of graduations on a different one of said tracks.

9. A computing scale having a weighing mechanism and a load receiving platter, a shaft connected with said weighing mechanism and displaceable from a fixed reference position through an arc proportional to the weight of the load on said platter, a counter drum having a plurality of series of recorded graduations thereon uniformly spaced and arranged in a track corresponding to units of weight and in a different track corresponding to value, means for continuously rotating said drum, a sensing unit rotatable with said drum for sensing said reference position and the displaced position of said shaft, a counter, a plurality of pickup means one of which is responsive to the passage of said weight track and another of which is responsive to the passage of said value track for actuating said counter to count the graduations within the extent of said arc, means for activating said sensing unit to operate one of said pickup means during a selected revolution of said drum to produce a count in said counter corresponding to the weight of said load, and means for activating said sensing unit during a different revolution of said drum to operate another said pickup means in relation to a selected one of said value tracks to produce a count in said counter corresponding to the value of the article at a selected unit price.

10. A computing scale having a weighing mechanism and a load receiving platter, a shaft connected with said weighing mechanism and displaceable from a fixed reference position through an arc proportional to the weight of the load on said platter, a counter drum having a plurality of series of recorded graduations thereon uniformly spaced and arranged in a track corresponding to units of weight and in a plurality of tracks corresponding to value at different unit prices, means for continuously rotating said drum, a sensing unit rotatable with said drum for sensing said reference position and the displaced position of said shaft, a counter, a plurality of pickup means one of which is responsive to the passage of said weight track and another of which is responsive to the passage of a selected one of said value tracks for actuating said counter to count the graduations within the extent of said arc, means for activating said sensing unit to operate one of said pickup means during a selected revolution of said drum to produce a count in said counter corresponding to the weight of said load, means for activating said sensing unit during a different revolution of said drum to operate another said pickup means to produce a count in said counter corresponding to the value of the article at a selected unit price, and means for adjusting the position of the other said pickup means in relation to said value tracks to respond to a selected one of said value tracks to provide for change of the selected unit price.

References Cited in the file of this patent

UNITED STATES PATENTS

| 1,638,103 | Roucka | Aug. 9, 1927 |
| 2,036,014 | Borger | Mar. 31, 1936 |
| 2,036,081 | Rast | Mar. 31, 1936 |
| 2,168,149 | Arnold | Aug. 1, 1939 |
| 2,420,509 | Whittaker | May 13, 1947 |
| 2,471,788 | Snyder | May 31, 1949 |
| 2,575,342 | Gridley | Nov. 20, 1951 |
| 2,617,705 | Coombs | Nov. 11, 1952 |
| 2,623,936 | Kennedy et al. | Dec. 30, 1952 |
| 2,680,241 | Gridley | June 1, 1954 |
| 2,730,698 | Daniels | Jan. 10, 1956 |
| 2,734,188 | Jacobs | Feb. 7, 1956 |

UNITED STATES PATENT OFFICE

CERTIFICATE OF CORRECTION

Patent No. 2,803,448                                            August 20, 1957

Lawrence B. Biebel

It is hereby certified that error appears in the printed specification of the above numbered patent requiring correction and that the said Letters Patent should read as corrected below.

Column 7, line 66, for "balance and" read -- balance, and --; column 10, list of references cited, add the following:

2,466,099    Hansen - - - - Apr. 5, 1949

Signed and sealed this 12th day of November 1957.

(SEAL)

Attest:

KARL H. AXLINE
Attesting Officer

ROBERT C. WATSON
                                                                                          Commissioner of Patents